United States Patent [19]

Hempel et al.

[11] Patent Number: 4,870,599

[45] Date of Patent: Sep. 26, 1989

[54] TRAVERSAL METHOD FOR A GRAPHICS DISPLAY SYSTEM

[75] Inventors: Bruce C. Hempel, Tivoli; Gregory D. Laib; Bob C. Liang, both of West Hurley, all of N.Y.

[73] Assignee: International Business Machines Corporation, Armonk, N.Y.

[21] Appl. No.: 912,876

[22] Filed: Sep. 26, 1986

[51] Int. Cl.[4] .............................................. G06F 3/153
[52] U.S. Cl. .................................... 364/518; 340/703; 340/729; 364/521
[58] Field of Search ............................... 364/518–522; 340/703, 729; 382/44–46

[56] References Cited

U.S. PATENT DOCUMENTS

| | | | |
|---|---|---|---|
| 4,475,104 | 10/1984 | Shen | 340/729 |
| 4,484,187 | 11/1984 | Brown et al. | 340/703 |
| 4,489,389 | 12/1984 | Beckwith et al. | 364/522 |
| 4,506,343 | 3/1985 | Ship, Jr. et al. | 364/900 |
| 4,520,358 | 5/1985 | Makino | 340/703 |
| 4,665,555 | 5/1987 | Alker et al. | 382/41 |

OTHER PUBLICATIONS

IBM 5080, Principles of Operation, GA23-2012-0, pp. 1—1 through 1-16.

Primary Examiner—Gary V. Harkcom
Assistant Examiner—H. R. Herndon
Attorney, Agent, or Firm—Mark S. Walker; George E. Clark

[57] ABSTRACT

A method for traversal of primitives in a graphics display system includes calculating pick data for a predetermined primitive, testing the primitive for invisibility, exiting to a next graphics order if the invisibility step is positive, testing the primitive for detectability, exiting to a next graphics order if the detectability test is false when traversal is performed for pick correlation purposes, determining whether a transformation environment update is required, recalculating the transformation environment if required, binding display attributes for the primitive and processing subsequent graphics orders to draw the primitive. Also, to eliminate unnecessary storing of registers when an execute structure is processed, a number of registers are set aside for storing control flags to selectively store registers into the stack. If a flag pick is zero the contents of the corresponding register will be stored on the stack. If the contents of the flag are one, indicating that the contents of the corresponding register has been stored on the stack, the contents will not be stored again, thus saving time and execution of the traversal.

10 Claims, 12 Drawing Sheets

A=CSID
B=NOMINAL WIDTH
C=NOMINAL HEIGHT
D=CAP TO TOP SPACE
E=BOTTOM TO BASE SPACE
F=NUMBER OF BITS USED TO REPRESENT HEIGHT

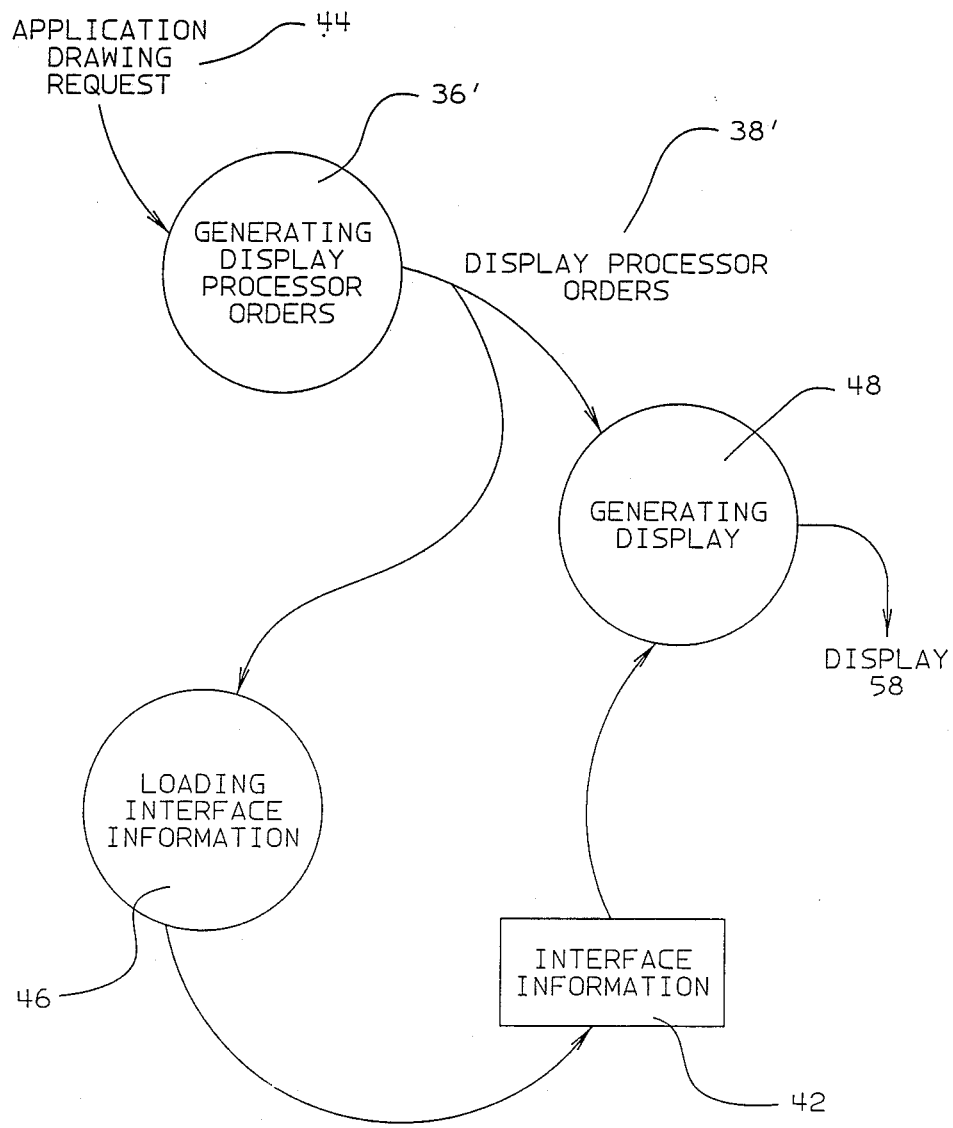

TRAVERSAL METHOD FOR A GRAPHICS DISPLAY SYSTEM

BACKGROUND OF THE INVENTION

The current invention relates to information handling systems, and more particularly to methods for data manipulation and display in a graphics display system.

Prior Art

The present invention provides an application program interface and implementation of the traversal process on the IBM 5080 Graphics Display System, described in IBM publication GA23-2012-0, IBM 5080 Model 2 Principles of Operation. The application program interface is consistent with the Phigs industry standard which defines a standard interface for generating graphics images from application programs. The terminology used herein is based on Phigs terminology. Traversal if the attribute binding, transformation, and drawing process for geometric primitives, such as lines, characters, markers, polygons, etc. For example, traversal determines the color and width of the line to be drawn when a graphic order specifies the drawing of a line between certain points.

A comparison with a prior art implementation is summarized in FIG. 2.

In the prior art IBM 5080 graphics workstation implementation, the traversal process is done via the display list program 38. Such a program consists of graphic orders which are interpreted by the display processor. The host application program 34 generates a drawing request, e.g. to draw a line. The driver 36 creates a display list program 38 to perform the necessary traversal and drawing functions and transmits that program to the workstation for execution by the display processor 26. The display list program 38 directs execution of the display processor microcode 40 to satisfy the drawing request. In the implementation discussed below, a new interface 42 is introduced between the host application program 34' and the display processor microcode 40', and the traversal process is implemented at the machine language level. This results in the saving of workstation memory storage and in improved performance.

The interface 42 contains much of the information formerly sent in the display list program 38. As a result, the new display list program 38' can be considerably smaller.

As an example, the prior art method of attribute binding for Polymarker Polymarker is a Phigs command for drawing one or more graphic markers on the display, its traversal requirements include (testing for invisibility, highlighting, and detectability; and satisfaction of the choices of the color, marker size, and marker type) required more than 50 bytes of user program memory. The new implementation of the same function, on the other hand, requires only four bytes.

The advantages of this system over the prior art are
1. more efficient use of workstation memory for user programs;
2. Fewer lines of code in display program reduces the link transmission time from the host to workstation.
3. the machine level language implementation eliminates the two-level interpretation process.

These advantages result in the saving of workstation memory storage and improved performance.

The IBM 5080 Graphics System is used here to illustrate a preferred embodiment.

SUMMARY OF THE INVENTION

Therefore, it is an object of the present invention to provide traversal of primitives in a graphics display system by an improved method including the steps of: calculating pick data for a predetermined primitive; testing the primitive for invisibility; exiting to a next graphics order if the invisibility test is positive; testing the primitive for detectability; exiting to a next graphics order if the detectability is false when traversal is being performed for pick correlation purposes; determining whether a transformation environment update is required; recalculating the transformation environment if required; binding display attributes for the primitive; and processing subsequent graphics orders to draw the primitive.

It is a further object of the present invention to provide for traversal of primitives in a graphics display system as above wherein the improved method includes the further step of selectively storing traversal state information based on the condition of flags stored in a plurality of registers.

It is a further object of the present invention to provide a method for generating a display image by generating display processor control orders, entering graphic control orders into an information interface area and generating the display based on the display processor orders and interface area information.

The foregoing and other objects, features and advantages of the present invention will be apparent from the following, more particular description of a preferred embodiment of the invention as illustrated in the accompanying drawings.

BRIEF DESCRIPTION OF THE DRAWINGS

FIG. 5a is a data flow diagram showing the improved method according to the present invention.

DETAILED DESCRIPTION OF THE PREFERRED EMBODIMENT OF THE INVENTION

A RASTER GRAPHICS SYSTEM

Figure 1:
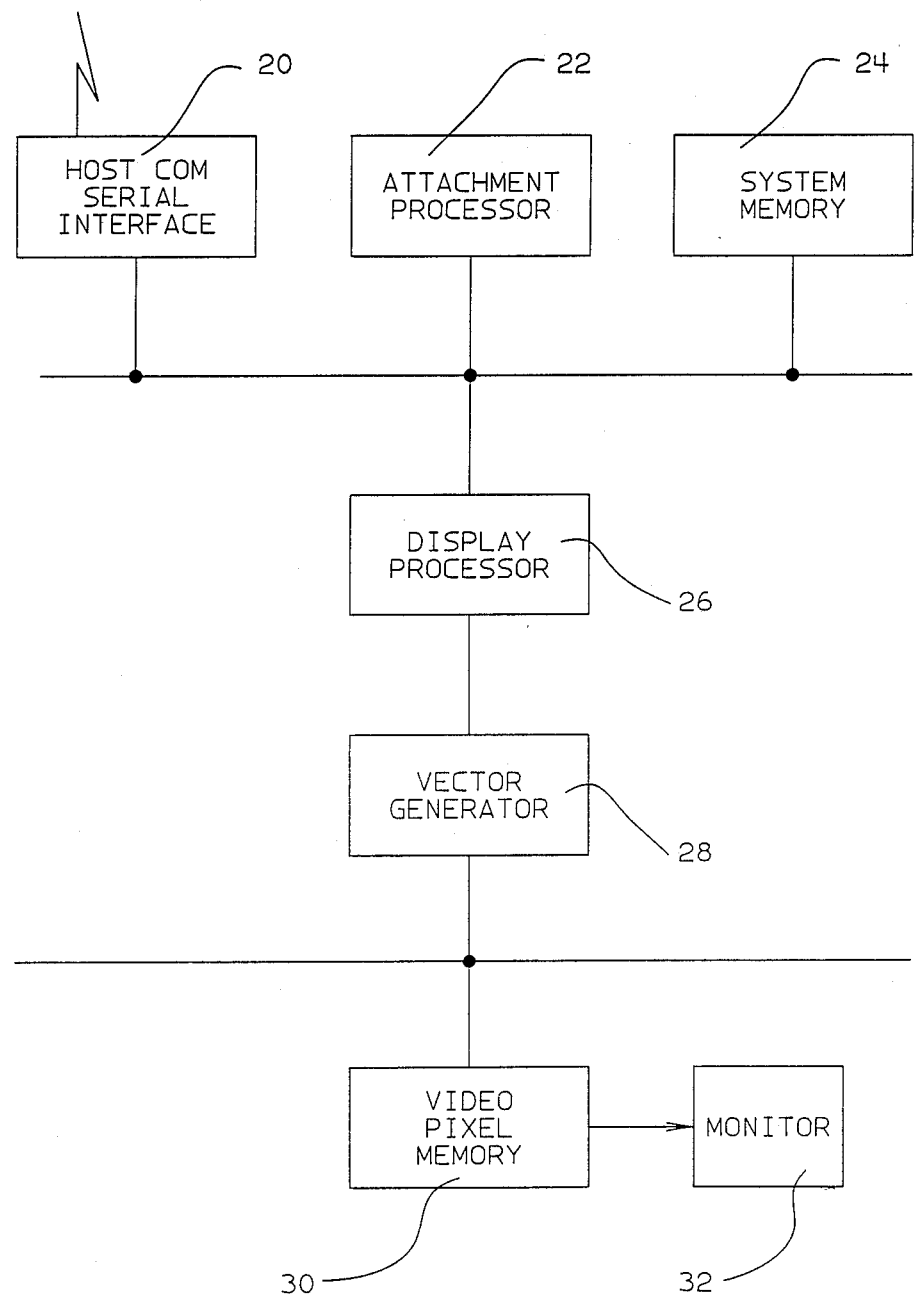
FIG. 1 is a block diagram of a raster graphics system capable of performing the method of the present invention.

Consider the raster graphics system in FIG. 1.
It consists of the following major components:
1. Attachment Processor 22
2. Host Communication Serial Interface Processor 20
3. Display Processor 26
4. Hardware Rasterizer - Vector Generator 28
5. Video Pixel Memory 30
6. System Memory 24
7. Display Monitor 32

Functions of the Major Components

The following is a brief overview of the functions of the major components.
1. Attachment Processor 22
   * The attachment processor 22 is a general purpose processor that has master control of the System. The attachment processor is responsible for servicing all attached Graphics I/O devices (except the light pen and display monitor).
   * Coordinating the associated processing with the display processor 26.
   * The attachment processor interfaces with the host via serial interface 20.
2. Serial Interface
   The serial interface 20 provides the serial interface of system to the host.
3. Display Processor 26
   The DP is responsible for executing the graphics orders in the display storage program residing in the system memory 24 and is mainly concerned with the generation of the image that will appear on the display monitor 32. It has the following functions:
   * Decoding graphics orders and executing non-drawing orders; e.g. bookkeeping and control.
   * Performs the transformation and clipping function for the geometric primitives: lines, characters, polygons, etc.
   * Preparing the following geometric objects for display: lines, characters, markers, filled polygons, by preprocessing and feeding the data to the vector generator 28 and video pixel memory 30.
4. Vector Generator 28
   Vector generator is a hardware implementation of the Bresenham line generating algorithm, which takes the end points of a vector (line) as input, and generates pixels in the video pixel memory 30 as output for display.
5. Video Pixel Memory
   Video pixel memory 30 consists of 8 lk by lk bit planes, which supports 256 colors simultaneously via color look-up tables. The image stored here will be displayed on the monitor 32.

The Logical Data Flow

For the logical data flow of the graphics system, see FIG. 1.
1. The Application Program is loaded from the host via the serial interface 20 to the System Memory 24;
2. The attachment processor 22 preprocesses the data (depending on the work required), then interrupts the DP 26;
3. The display processor 26 then processes the data;
4. The data is then passed to the VPM 30 for display directly or via the vector generator 28.

DISPLAY PROCESSOR

The Display Processor 26 is a microprogrammed system. It fetches the data from the memeory and sends the data out to the raster display via the Vector Generator 28, which is a rasterizer. It takes the line segment end points coordinates as input, and generates pixels in the video pixel memory 30.

Figure 3:
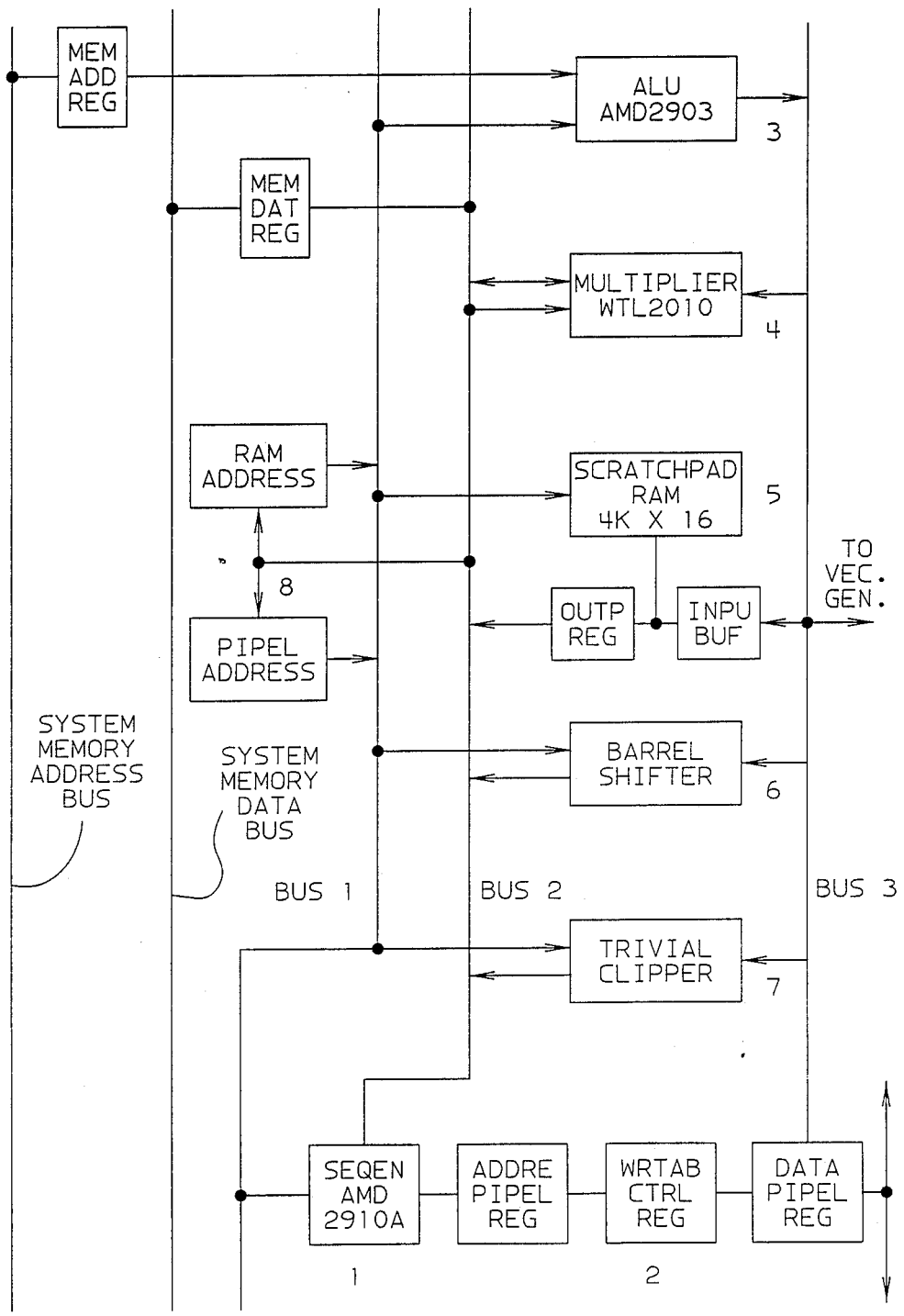
FIG. 3 is a block diagram of a display processor suitable for use with the raster graphic system shown in FIG. 1.

The main ingredients of the system (see FIG. 3) are:
1. sequencer, e.g. AMD2910A;
2. 72-bit wide writable control store;
3. 16-bit ALU, e.g. 4 bit slice AMD2903;
4. a 16x16 multiplier with 32-bit accumulator, e.g. WTL2010;
5. a 32-bit barrel shifter;
6. a clipper (for checking revival accept/reject);
7. 4k x 16 scratch ram;
8. logic for microcode next address coming from the content of scratch pad ram registers—indexed addressing.

The microprogram is stored in the writable control store.

APPLICATION PROGRAM INTERFACE

The present invention relates to providing an application program interface and implementation of the traversal process. The application program interface includes a definition of an interface area and specifies the process for using this area to communicate between the host and the display processor.

INTERFACE

The interface between the host program and the display processor 26 is defined in the 256 graphics interface registers (see section on communication area for detail) in the display processor scratch pad ram. (See FIG. 3).

For each of the six drawing primitives: line, marker, annotation text, geometric text, polygon, and pixel array, the attributes (such as color, line width, line type for line) are contained in the graphics interface registers, which also contain the view, global, and modelling transformation matrices applying to the primitive.

The attribute binding process of a drawing primitive is implemented in the display processor microcode using the data from the 256 graphics interface registers (see the section on polymarkers).

DESCRIPTION OF THE COMMUNICATION AREA

The contents of the graphics interface registers in a graphics workstation embodying the present invention is as follows:
0-1- Pick interrupt address. The DP will simulate a branch and link to this address whenever a primitive is detected and GIR 188, bit 0 is set. This will probably be performed within the tail order.
2 - Page containing head and tail of picked element.
3 - Offset in page of begin primitive order +4.
4 - Offset in page of end primitive order +2.
5 Not currently used.

67 Pick Identifier. An arbitrary 32 bit number which is returned to the application when a primitive is picked.

8 Element counter. This GIR is set to zero when traversal of a structure is started and incremented by each structure element. This includes attribute setting functions as well as primitives. The value in this register will be returned to the application when a primitive is picked.

9-10 Structure Identifier. Contains an arbitrary 32 bit number which is the application specified identifier of the structure being traversed.

11 Structure normalization scale factor. Signed 15 bit integer. (Sxxx xxxx xxxx xxxx).

12 X translation to center of structure extent. (Sxxx.xxxx xxxx xxxx)

13 Scale factor for x translation in GIR 12. Signed 15 bit integer. (Sxxx xxxx xxxx xxxx).

14 Y translation to center of structure extent (Sxxx.xxxx xxxx xxxx).

15 Z translation to center of structure extent Sxxx.xxxx xxxx xxxx).

17 Scale factor for z translation in GIR 16. Signed 15 bit integer. (Sxxx xxxx xxxx xxxx).

18 Matrix control Flags
   Bit 0—Set to 1 if global or view matrix has been changed. Therefore, recompute Global * View and save.
   Bit 1—Set to 1 if Local transformation has changed. Therefore, recompute Normalization * Local * saved result of Global * View.
   Bit 2—Set if recalculation of 5080 TCF parameters is needed.
   Bits 3-15 Reserved.

19 Text Attribute Control Flags. Used to optimize the processing required by geometric text primitives.
   Bit 0—Set to 1 if character height, expansion factor, up vector precision or spacing has changed.
   Bit 1—Set to 1 if font has changed.

Attribute Source Flags. Identifies whether the individual or bundled attribute value is to be used when rendering the corresponding primitive. (0=individual, 1=bundled).
   Bit 0—Polyline Color Index
   Bit 1—Polyline Line Width
   Bit 2—Polyline Line Type
   Bit 3—Polymarker Color Index
   Bit 4—Polymarker Size
   Bit 5—Polymarker Type
   Bit 6—Interior Color Index
   Bit 7—Interior Style
   Bit 8—Interior Style Index
   Bit 9—Edge Flag
   Bit 10—Edge Color Index
   Bit 11—Edge Linetype
   Bit 12—Edge Linewidth. (not supported)

21 Attribute Source Flags (Continued)
   Bit 0—Text Precision
   Bit 1—Text Color Index
   Bit 2—Text Font
   Bit 3—Character Expansion Factor
   Bit 4—Character Spacing 22 Highlighting Color Index. A value in the range 0-255 which indicates the color table index which is to be used to draw a primitive when highlighting is on.

23 Polyline Individual Color Index. A value in the range 0-255 which indicates the color table index which is to be used when drawing polylines if the corresponding ASF is set to individual.

24 Polyline Individual Line Width. The width is specified as a 12 bit binary number. Its meaning is identical to the 'w' bits in the attribute register 21-22. This value will only be used to draw polylines when the corresponding ASF is set to individual.

25 Polyline Individual Line Type. This value is specified as a number in the range 0-15. This is identical to the 't' bits in attribute register 2.

26 Polyline Individual Line End Control. This value is specified in bits 14-15. These bits have the same meaning as the 'e' bits in attribute register 22.
   X'0010'=Flat end
   X'0020'=Round end
   X'0030'=Square end 27 Polyline Bundled Color Index. A value in the range 0-255 which indicates the color table index which is to be used when drawing polylines if the corresponding ASF is set to bundled.

28 Polyline Bundled Line Width. The width is specified as a 12 bit binary number. Its meaning is identical to the 'w' bits in the attribute registers 21-22. This value will only be used to draw polylines when the corresponding ASF is set to bundled.

30 Polymarker Individual Color Index. A value in the range 0-255 which indicates the the color table index which is to be used when drawing polymarkers if the corresponding ASF is set to individual.

31 Polymarker Individual Marker Size. The size of a polymarker is specified in terms of a Marker character set identifier. The value contained in this register will have the same meaning as attribute register 20. The following values may be specified:
   X'0004'=Basic size
   X'0005'=Large size
   X'0006'=Small size
   X'0007'=Medium size 32 Polymarker Individual Marker Type. This register will specify the type of marker to be used on succeeding polymarker primitives. This register has the same interpretation as the attribute register 1.

33 Polymarker Bundled Color Index. The value contained in this register has the same meaning as GIR 30 except it is only used when the ASF for this attributes is set to bundled.

34 Polymarker Bundled Marker Size. The value contained in this register has the same meaning as GIR 31 except it is only used when the ASF for this attributes is set to bundled.

35 Polymarker Bundled Market Type. The value contained in this register has the same meaning as GIR 32 except it is only used when the ASF for this attributes is set to bundled.

36 Interior Individual Color Index. This register will contain a value in the range 0-255 which indicates the color table index which is to be used when filling the interior of a polygon or drawing the edge of a hollow polygon with edge off. This register is only used if the corresponding ASF is set to individual.

37 Interior Individual Style. The content of this register will indicate how the interior of the polygon is to be drawn. Valid values include:
   0 =Hollow (no fill, draw edge in interior color if efge off)
   1 =Solid, fill with solid color
   2 =Fill with user defined pattern from pattern table
   3 =Fill with hatch pattern from hatch table This register is used foro the interior style only if the interior style ASF is set to individual.

38 Interior Individual Style Index. If the interior style is either pattern (3) or hatch (4) then this register will contain the index of the entry in the corresponding table that is to be used to fill the polygon. The addresses of the pattern and hatch table are contained in other GIR's. This register is used only when the corresponding ASF is set to individual.

39 Interior Bundled Color Index. This register has the same meaning and use as GIR 36 except that this one is only used when the ASF is set to bundled.

40 Interior Bundled Style. This register has the same meaning and use as GIR 37 except that this only is only used when the ASF is set to bundled.

41 Interior Bundled Style Index. This register has the same meaning and use as GIR 38 except that this one is only used when the ASF is set to bundled.

42 Edge Individual Flag. Indicates whether the edge of a polygon is to be drawn or not. (0=OFF,1=ON).

43 Edge Individual Color Index. This register will contain a value in the range 0–255 which indicates the color table index which is to be used when drawing the edge of a polygon and when the edge flag is set to ON. This register is only used if the corresponding ASF is set to individual.

44 Edge Individual Linetype. This register will contain a value in the range 0–15 which identifies the line style that the edge of the polygon is to be drawn in if the edge flag is on. This value is identical to the 't' bits in the attribute register 2. This value will only be used when the corresponding ASF is set to individual.

45 Edge Individual Linewidth. Not used currently, reserved for future use.

46 Edge Bundled Flag. This register has the same meaning and use as GIR 42 except that this one is only used when the ASF is set to bundled.

47 Edge Bundled Color Index. This register has the same meaning and use as GIR 43 except that this one is only used when the ASF is set to bundled.

48 Edge Bundled Linetype. This register has the same meaning and use as GIR 44 except that this one is only used when the ASF is set to bundled.

49 Edge Bundled Linewidth. Not used currently, reserved for future use.

50 Text Precision (Individual). This register determines which of the text attributes are to be applied when drawing a geometric text primitive. The valid values and their meaning for annotation and geometric text is shown below:

|  | Annotation | Geometric |
| --- | --- | --- |
| Bit 0 - String | Height SF, color | CSID, Font, Height, Color |
| Bit 1 - Char | Height SF, Path, Spacing | All |
| Bit 2 - Stroke | Height SF, Path, Spacing | All |

51 Text Color (Individual). This register will contain a value in the range 0–255 which specifies the color table index that is to be used for drawing Annotation or Geometric text primitives. This regtister is only used when the corresponding ASF is set to individual.

Figure 4:
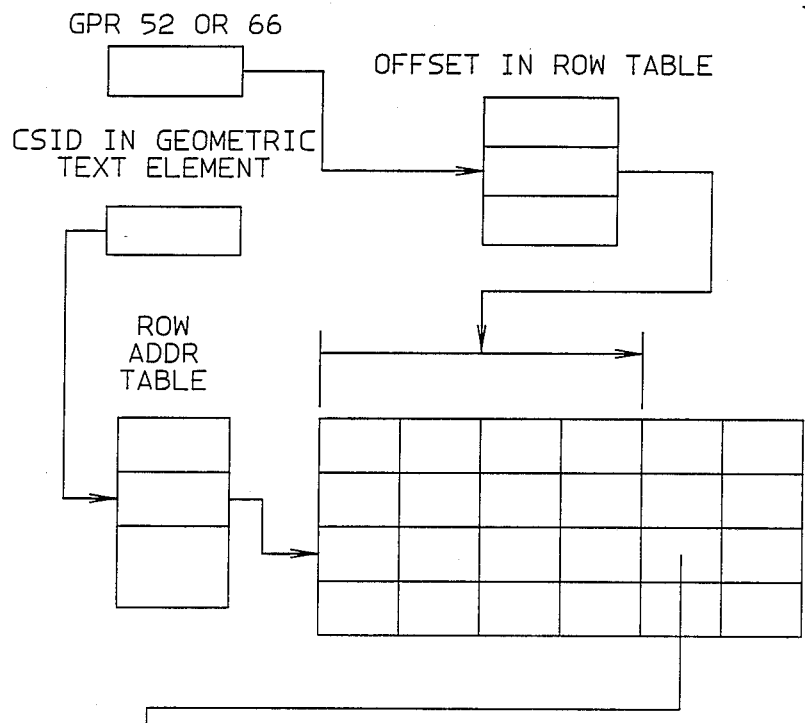
FIG. 4 shows an address pointer structure for a programmable character set description table.

52 Text Font (Individual). This value contains an address of a DLB location which contains the row offset into the font address table. This register is used in conjunction with the Character Set Identifier that is specified on Geometric text elements. See FIG. 4 for more information. This value is only used when the corresponding ASF is set to individual.

53 Character Expansion Factor (Individual). This register contains a value which represents the deviation of the width of the character from that defined in the PCS (Programmable Character Set). This value is multiplied times the PCS nominal width to obtain the actual character width. The value in this register will be in the form S.xxxxxxxxxxxxxxx. This register is only used when the corresponding ASF (Attribute Source Flag) is set to individual.

54 Character Expansion Scale Factor (Individual). This register specifies the exponent for the value in register 53 and is only used when the Character Expansion Factor ASF is set to individual.

55 Character Spacing (Individual). This register contains a value which defines the amount of additional space to be placed between characters. The value is multiplied times the character height to obtain the spacing between characters. The actual width of a character is then added to the actual spacing to obtain the spacing to be given to the hardware. The value in this register will be in the form S.xxxxxxxxxxxxxxx. This register will only be used when the corresponding ASF is set to individual.

56 Character Spacing Scale Factor (Individual). This register specifies the exponent for the value in register 55 and is only used when the Character Spacing ASF is set to individual.

57 Text Height. This register defines the height of geometric text primitives. The value will be specified in the form S.xxxxxxxxxxxxxxx.

58 Text Height Scale Factor. This register specifies the exponent for the value in register 67.

59 Annotation Height Scale Factor. This register specifies the height to be used in drawing succeeding annotation primitives. The value specified will be the same as the CSIDs for the 4 hardware character heights. They are:
X'0004' = Basic size
X'0005' = Large size
X'0006' = Small size
X'0007' = Medium size 60 Character Up Vector (Sine). This register will contain the sine of the angle formed between the character up vector and the X-axis of the text coordinate system. The format of the number will be Sx.xxxxxxxxxxxxxx.

61 Character Up Vector (Cosine). This register will contain the cosine of the angle formed between the character up vector and the X-axis of the text coordinate system. The format of the number will be Sx.xxxxxxxxxxxxxx.

62 Text Alignment. This register specifies the alignment of text primitives relative to their position. The format of the value in this register is:
Byte 0—Vertical Alignment
Bit 0—Normal
Bit 1—Top
Bit 2—Cap
Bit 3—Half
Bit 4—Base
Bit 5—Bottom Byte 1—Horizontal Alignment
Bit 8—Normal
Bit 9—Left Bit 10—Center Bit 11—Right 63 Text Path. This register specifies the direction in which succeeding characters in an annotation or geometric text primitive are to be positioned relative to the previous character. This value has the same format as attribute 'iiii' bits. Valid values for this register are:

X'0000'=Right

X'0040'=Up

X'0080'=Left

X'00C0'=Down

64 Text Precision (Bundled). This register has the same meaning as GIR 50 except that it is only used when the corresponding ASF is set to bundled.

65 Text Color (bundled). This register has the same meaning as GIR 51 except that it is only used when the corresponding ASF is set to bundled.

66 Text Font (Bundled). This register has the same meaning as GIR 52 except that is only used when the corresponding ASF is set to bundled.

67 Character Expansion Factor (Bundled). This register has the same meaning as GIR 53 except that it is only used when the corresponding ASF is set to bundled.

68 Character Expansion Factor Scale Factor (Bundled). This register has the same meaning as GIR 54 except that it is only used when the corresponding ASF is set to bundled.

69 Character Spacing (Bundled). This register has the same meaning as GIR 55 except that it is only used when the corresponding ASF is set to bundled.

70 Character Spacing Scale Factor (Bundled). This register has the same meaning as GIR 56 except that it is only used when the corresponding ASF is set to bundled.

71 Last used character set id. This register will be used by the microcode when processing a geometric text primitive to determine whether the character set id specified is the same as the previous geometric text primitive. The DLB program will clear this register to force the microcode to resolve the text attributes.

72-81 Text Attribute Composite Matrix. These registers will contain a 3×3 matrix which will be used to achieve the current set of text attributes. This matrix contains the accumulation of Height, Expansion Factor, and Up vector. The order of the values in this are as follows:

72—M11

73—M12

74—M13

75—M21

76—M22

77—M23

78—M31

79—M32

80—M33

81—Scale factor 82-97 Global Modeling Transformation Matrix. These registers will contain the current global modeling transformation. The format of the matrix will be:

Matrix elements M11-M33 will be in the form S.xxx xxxx xxxx xxxx.

Matrix elements M41-43 will be in the form Sxxx.xxxx xxxx xxxx.

All scale factors will be signed 15 bit integers. (Sxxx xxxx xxxx xxxx).

82—M11

83—M12

84—M13

85—M21

86—M22

87—M23

88—M31

89—M32

90—M33

91—Scale factor for M11-M33 (-512 if identify)

92—M41

93—Scale factor for M41

94—M42

95—Scale factor for M42

96—M43

97—Scale factor for M43

98-113 Local Modeling Transformation Matrix. These registers contain the local modeling transformation matrix. The order of the term in the matrix will be the same as in the global modeling transformation matrix.

114-129 View Transformation Matrix. These register contain the viewing transformation matrix. The order of the terms in the matrix will be the same as in the global modeling transformation matrix.

130-135 Clipping Boundaries. These registers will contain the current window. The format of these values will be Sxxx.xxxxxxxxxxxx.

136 Viewpoint. This register will contain the current viewpoint for perspective. The format of this value will be Sxxx.xxxxxxxxxxxx.

137-152 Result of Global * View. These registers will contain the result of concatenating the Global transformation time the View transformation. The order of the terms of this matrix will be the same as the global modeling transformation matrix.

153-168 Result of Normalization * Local * Global * View. These registers will contain the concatenation of the four matrices. The order of the terms of this matrix will be the same as the global modeling transformation matrix.

169 Number of class names currently in class set and Pick Inclusion Filter. This register will be incremented each time a bit is turned on in the current set that is also in the pick inclusion filter. It will be decremented each time a bit is turned off in the pick set that is also in the inclusion pick filter. If this register is greater than zero and GIR 170 is equal to zero then detectability is on.

170 Number of class names currently in class set and Pick Exclusion Filter. This register will be incremented each time a bit is turned on in the current set that is also in the pick exclusion filter. It will be decremented each time a bit is turned off in the pick set that is also in the exclusion pick filter. If this register is greater than zero then detectability is off.

171 Number of class names currently in class set and Highlighting Inclusion Filter. This register will be incremented each time a bit is turned on in the current set that is also in the highlighting inclusion filter. It will be decremented each time a bit is turned off in the pick set that is also in the inclusion highlighting filter. If this register is greater than zero and GIR 172 is equal to zero then highlighting is on.

172 Number of class names currently in class set and Highlighting Exclusion Filter. This register will be incremented each time a bit is turned on in the current set that is also in the highlighting exclusion filter. It will be decremented each time a bit is turned off in the pick set that is also in the exclusion highlighting filter. If this register is greater than zero then highlighting is off.

173 Number of class names currently in class set and Invisibility Inclusion Filter. This register will be incremented each time a bit is turned on in the current set that is also in the invisibility inclusion filter. It will be decremented each time a bit is turned off in the pick set that is also in the invisibility inclusion filter. If this register is greater than zero and GIR 174 is equal to zero then visibility is turned off.

174 Number of class names currently in class set and Invisibility Exclusion Filter. This register will be incremented each time a bit is turned on in the current set that is also in the invisibility exclusion filter. It will be decremented each time a bit is turned off in the pick set that is also in the invisibility exclusion filter. If this register is greater than zero then visibility is turned on.

175-190 Class set (1 bit/class name - max 256 class names) This field contains one bit for each supported class name. The corresponding bit is turned on when a class name is added to the set and turned off when removed from the set.

191 Control flags. Bits 0-3 in this register will be set according to the class set counts maintained above.
Bit 0—Detectability is on if set.
Bit 1—Highlighting is on if set.
Bit 2—Invisible if on.
Bit 3—Pick Correlation-Only Mode. This bit is set to allow the microcode to skip primitives which are not detectable or to optimize the correlation process.

192 Pattern/Hatch Table Page Number. This register will contain the page number which contains the pattern and hatch tables and is used in conjunction with GIRs 193 and 194 to load pattern/hatch table entries. This register is set at initialization and is never changed.

193 Pattern Table Address. Contains the address of the pattern table address. Each entry of the table will contain 256 bytes of color table indices. When the interior style is set to pattern, the interior style index will be used to index into this table to obtain the pattern to load into the hardware for filling succeeding polygons. The pattern table will always be in page 0.

194 Hatch Table Address. Contains the address of the hatch table. When the interior style is set to hatch, the interior style index will be used as an index into this table. Each entry will contain 32 bytes in which each bit corresponds to a position in a 16 by 16 pattern. (row order). If a bit is on, the pattern cell should be filled with the interior color index. Otherwise, it should be filled with 0. The microcode will construct this pattern from the hatch table entry and then load it into hardware.

195 Current Pattern/Hatch Table Entry Address. Contains the address of the currently loaded pattern/hatch table entry. This issued by the microcode to eliminate loading a pattern which is already loaded. This field will be cleared when the DLB program wants to force reloading of a pattern. If the requested pattern/hatch table entry address does not match this register then the pattern/hatch must be reloaded.

196 Current Interior Color of Loaded Hatch. This field will contain the interior color index that was used to construct the hatch pattern that is now loaded in the hardware. It will used in conjunction with GIR 195 to eliminate reloading of a hatch pattern that is already loaded. If the address in GIR 195 matches the requested hatch table entry address and the contents of this register match the effective interior color index then no new pattern load is required.

197 Pattern/Hatch Maximum Table Entries. The following filed are used by the microcode to save information that was calculated during the processing of a geometric text primitive that may be used on succeeding geometric text primitives.

198 Effective CSID for geometric text.
199 Effective Normal Height (PCS Q).
200 Effective Nominal Width
201 Effective Cap to Top Spacing
202 Effective Bottom to Base Spacing
203 Effective Spacing. Calculated by Microcode
204 Effective Path. Calculated by Microcode
224-239 Work area for matrix calculations. The contents of these registers are not preserved across Begin/End Primitive orders.
240-255 Control Flags for Load attribute registers. These registers contain 1 bit for each graphics interface register. These regs will be cleared each time traversal is started. When a load attribute register is encountered, the control bits for the specified registers will be examined. If the bit is zero, the contents of the registers will be pushed prior to loading the new value. The control bits will also be set at this time. If the control bits were already one, the contents of the registers will not be stacked.

EXAMPLE OF USE OF COMMUNICATION AREA

Figure 5:
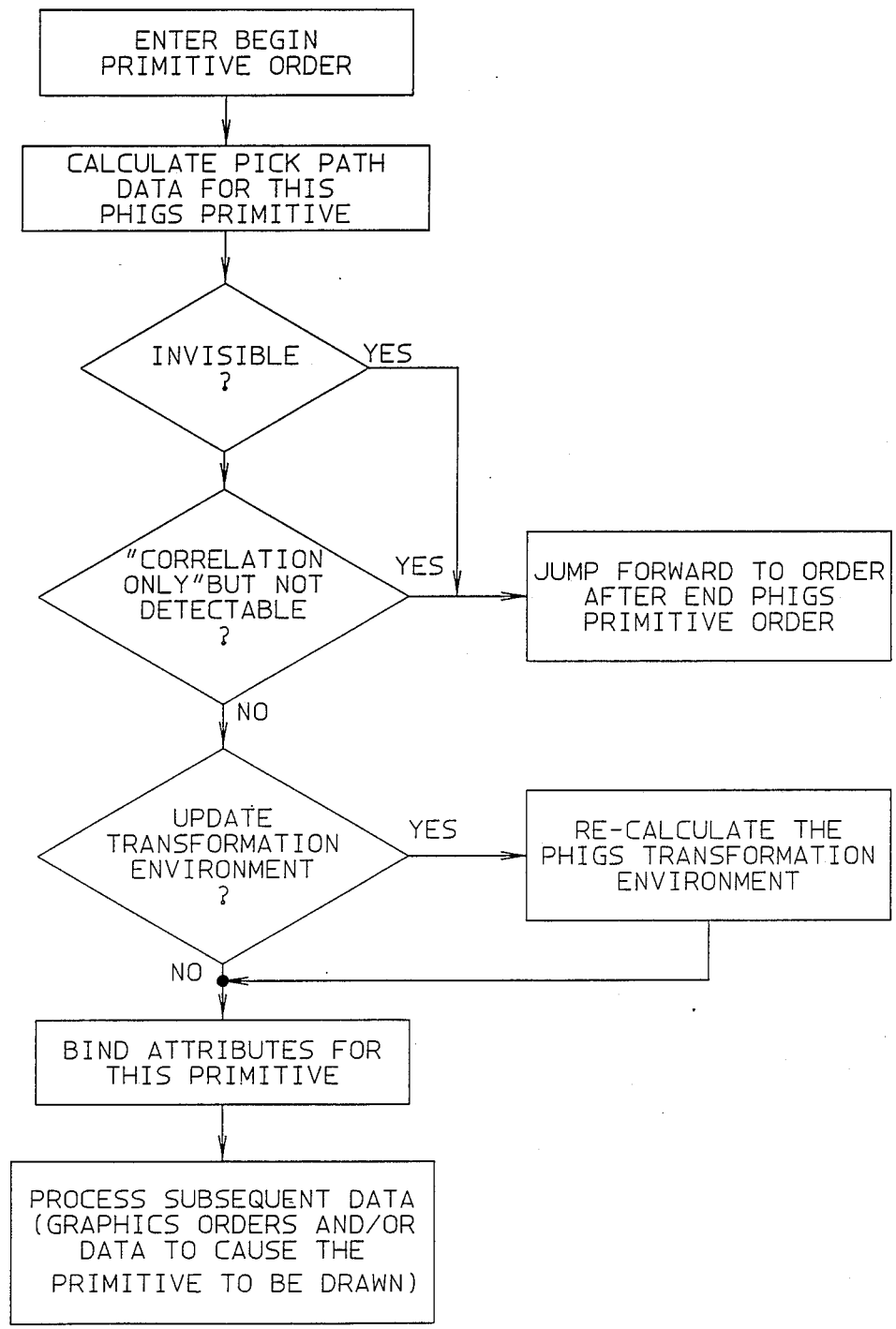
FIG. 5 is a flow chart showing, in greater detail, a portion of the improved method according to the present invention.

As an example of how the interface area described earlier is used, we will now discuss the Begin Polymarker and the End Primitive orders implemented on the IBM 5080 model 2. These orders are two of seven new orders implemented through the use of the present invention to support six drawing primitives available to applications using the IBM graPHIGS TM Program product. In addition to the Begin Polymarker order, orders have been defined to support the drawing of polylines, annotation text, geometric text, polygons, and pixel blocks. A generalized flowchart of the processing performed by any of the six Begin Primitive orders is shown in FIG. 5. This section describes the Begin Polymarker and the End PHIGS Primitive orders in detail to give one example of how the previously described PHIGS communication area is used.

Figure 2:
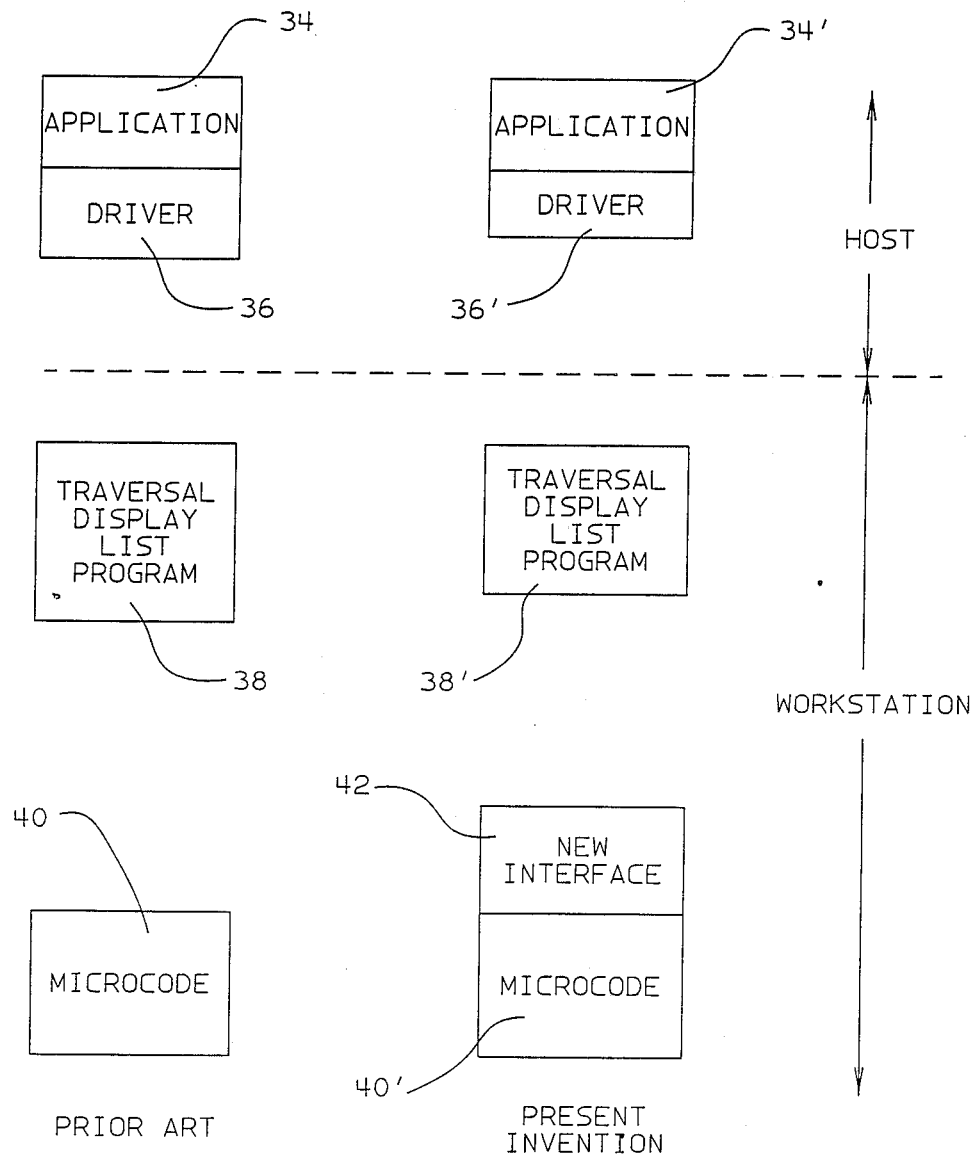
FIG. 2 is a block diagram comparison of the method according to the present invention with a prior art method of performing traversal.

The IBM graPHIGS program product (a driver 36' as shown in FIG. 2 and FIG. 5a) will generate a graphics display list 38' program in response to its invocation 44 by the application program 34' in control. If the application requests the generation of polymarkers on the screen, a portion of the generated datastream will appear as follows:

---

.
.
.
Begin Polymarker opcode
Length of the polymarker data
Polymarker data (consisting of orders to draw the polymarkers)
End Phigs primitive opcode
(graphic orders for next Phigs primitive)
.

---

The orders in the data stream prior to the Begin Polymarker order, load 46 the information it needs into the interface area 42. The data word immediately following the Begin Polymarker opcode gives the number of bytes in the polymarker data.

BEGIN POLYMARKER ORDER

Figure 6A:
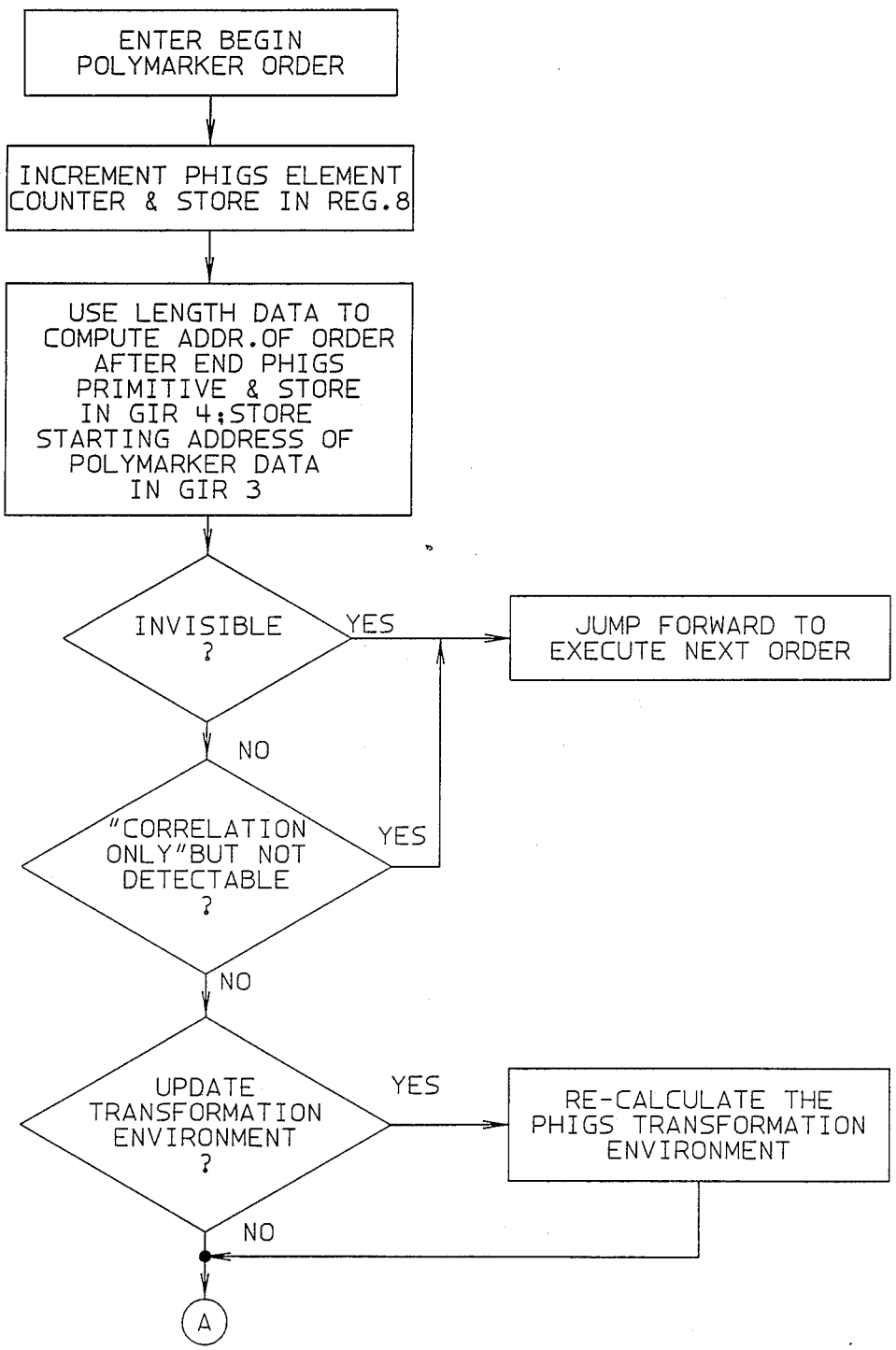
FIG. 6, which consists of FIGS. 6A, 6B and 6C is a flow chart showing a specific example of the method according to the present invention with reference to a Polymarker graphics order.
Figure 6B:
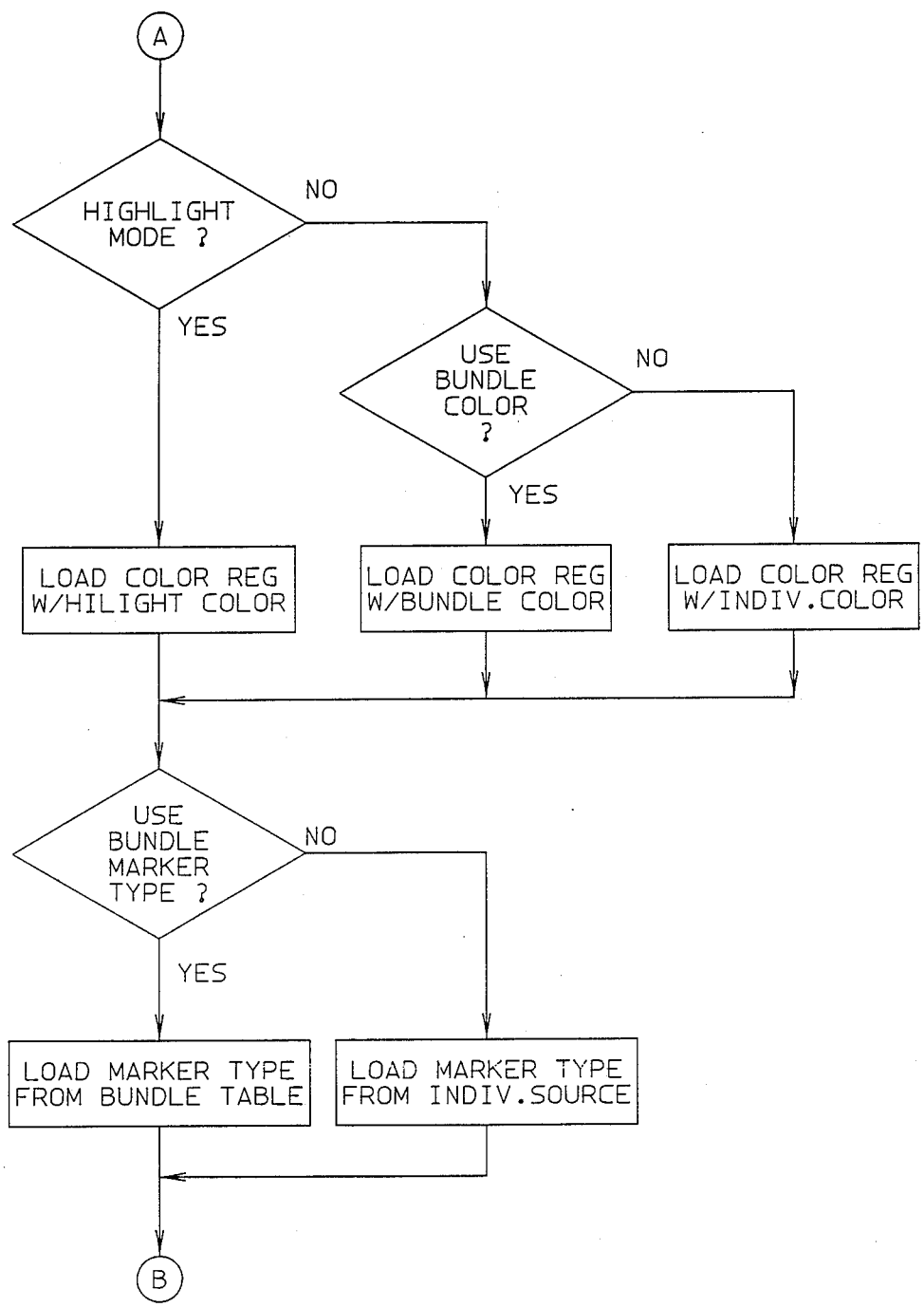
Figure 6C:
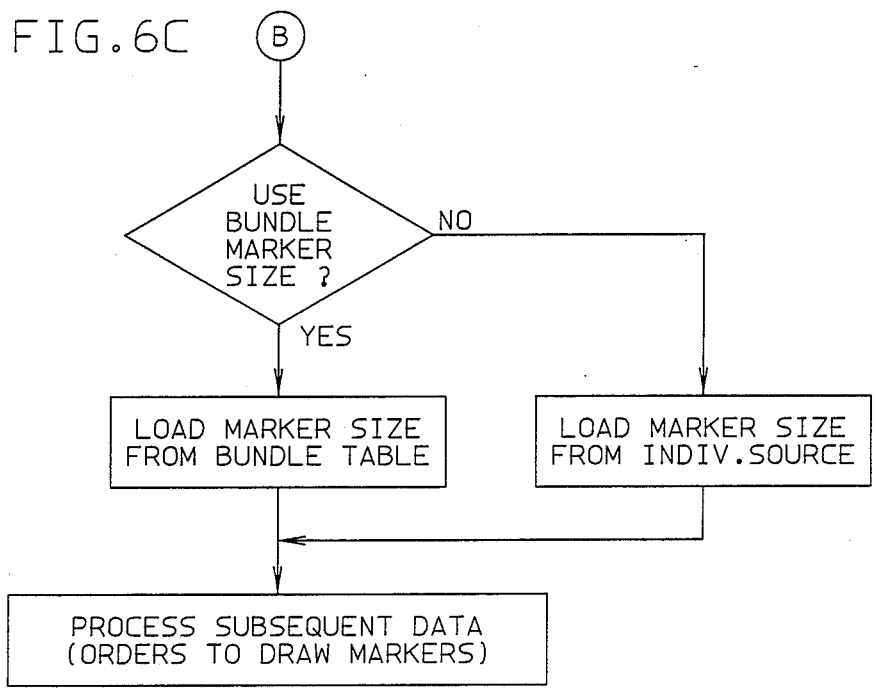

When the Begin Polymarker order is executed, the following actions will be taken (See FIG. 6):

Example of use of graphic interface registers (GIR) in the interface area 42:

1. Calculate and store 'pick path' data (such as element number, address of the primitive, etc.) used later if a pick occurs (i.e. the workstation operator selected an item on the display monitor for immediate action.).
2. If the invisibility bit in GIR 191 is one, the length data is used to jump forward past the End Primitive opcode to execute the graphics orders for the next primitive.
3. If the 'correlation-only' mode bit in GIR 191 is on and the detectable bit in GIR 191 is off, jump forward past the End Primitive opcode to execute the graphics orders for the next primitive.
4. If any of the three matrix control flag bits in GIR 18 are on, update the transformation environment (re-compute the transformation matrix and related variables based on the matrices defined in the interface area).
5. Set the appropriate coloro for the polymarkers about to be drawn. This data is obtained by examining the flags in GIRs 20 and 191, and then using the appropriate color from GIRs 22, 30, or 33.
6. Set the appropriate marker size for the polymarkers about to be drawn. This data is obtained by examining the flags in GIR 20, and then using the appropriate marker size from GIRs 31 or 34.
7. Set the appropriate markertype for the polymarkers about to be drawn. This data is obtained by examining the flags in GIR 20, and then using the appropriate marker type from GIRs 32 or 35.

END PHIGS PRIMITIVE ORDER

Figure 7:
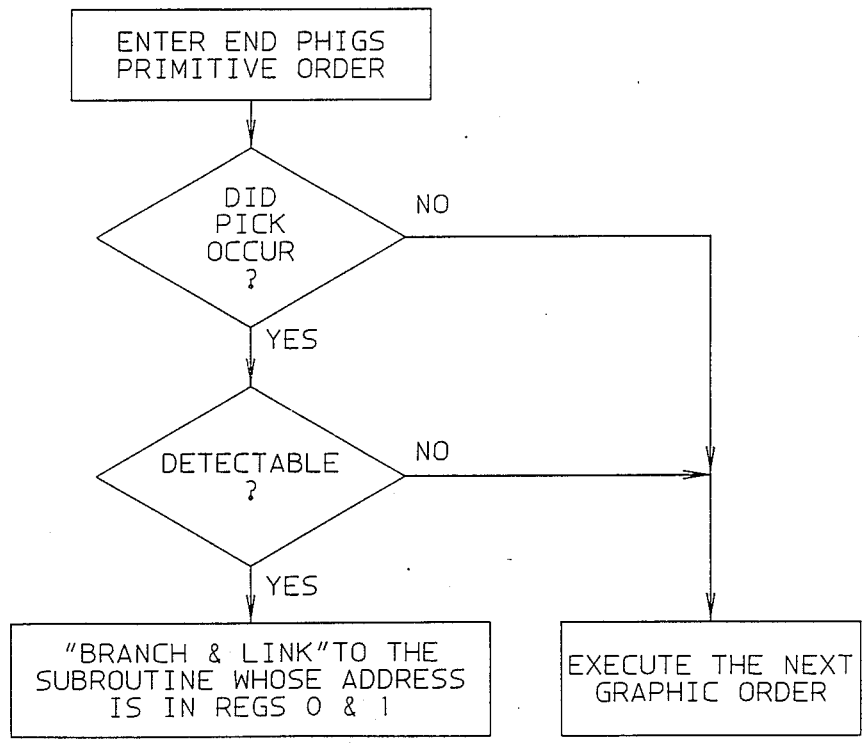
FIG. 7 is a block diagram showing an End primitive order.

When the End PHIGS Primitive order is executed, the following actions are taken (See FIG. 7):

1. If no pick occurred during the drawing of the polymarkers, or if the detectable flag in register 191 was not set, execution continues with the graphics orders for the next primitive.
2. If a pick occurred and the detectable flag in register 191 was set, a "branch and link" is done using the address in registers 0 and 1 (registers 0 and 1 were previously loaded with the address of a 'pick handler' subroutine).

MANIPULATION OF THE DATA IN THE INTERFACE AREA

INTERFACE AREA REGISTERS

The registers in the interface area 42 may be separated into 5 groups:

| polyline attributes | registers 23-29 |
| polymarker attributes | registers 30-35 |
| area-fill interior attributes | registers 36-41 |
| area-fill edge attributes | registers 42-49 |
| text attributes | registers 50-81 |

In addition to this, there are data for the transformation matrices associated with the drawing primitives.

Each of the drawing primitives has a set of attribute registers associated with it. For example, the following registers pertain to Polymarkers:

1. bundled attributes (several attributes for a primitive that area always referenced together as a bundle.)
   reg 30 polymarker bundled color index
   reg 31 polymarker bundled marker size
   reg 32 polymarker bundled marker type
2. individual attributes
   reg 33 polymarker individual color index
   reg 34 polymarker individual marker size
   reg 35 polymarker individual marker type For each attribute, the possible source is from the bundle table or individual registers depending on the bit corresponding to that attribute in the ASF. The contents of registers 20-21 Attribute Source Flags (ASF) will determine which registers (individual or bundled) will apply at the time of processing the polymarker data.

STACK OPERATION FOR COMMUNICATION AREA REGISTERS

There is a stack for storing the attribute registers data for processing the "Execute Structure" structure element. (see FIGS. 8 and 9). A "structure" in Phigs is a command or subroutine. "Execute Structure" is a call to another command or subroutine from within a first structure. Current status must be saved and then restored once the called structure has terminated.

Figure 8:
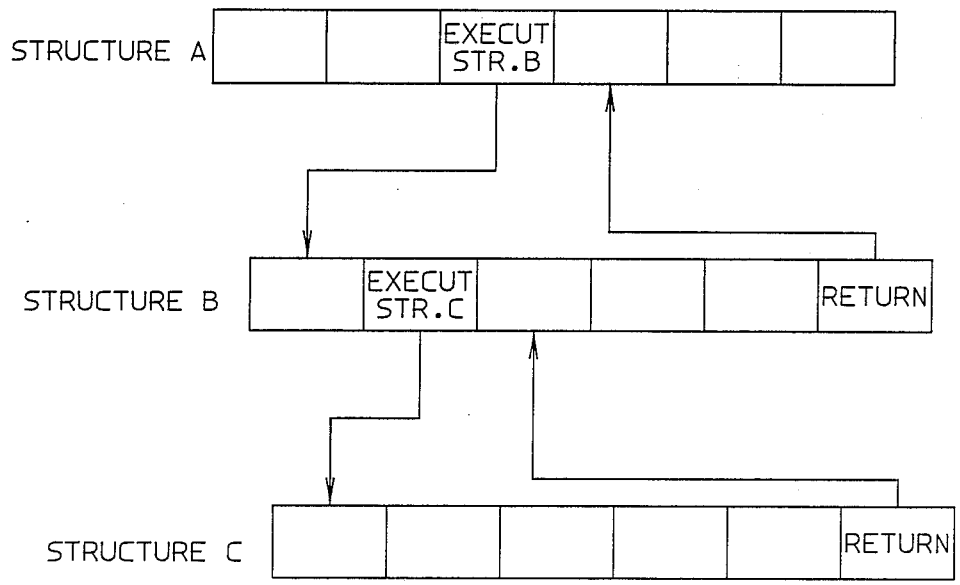
FIG. 8 is a schematic diagram showing an execute structure having several levels.

In FIG. 8, structure A called structure B, which can alter the state of the device, e.g. the attribute registers associated with a Polymarker.

When an "Execute Structure" structure element is executed, some of the registers associated with the "calling" structure will be saved on the stack; e.g. attribute registers, transformation matrix, ASF, etc.

Figure 9:
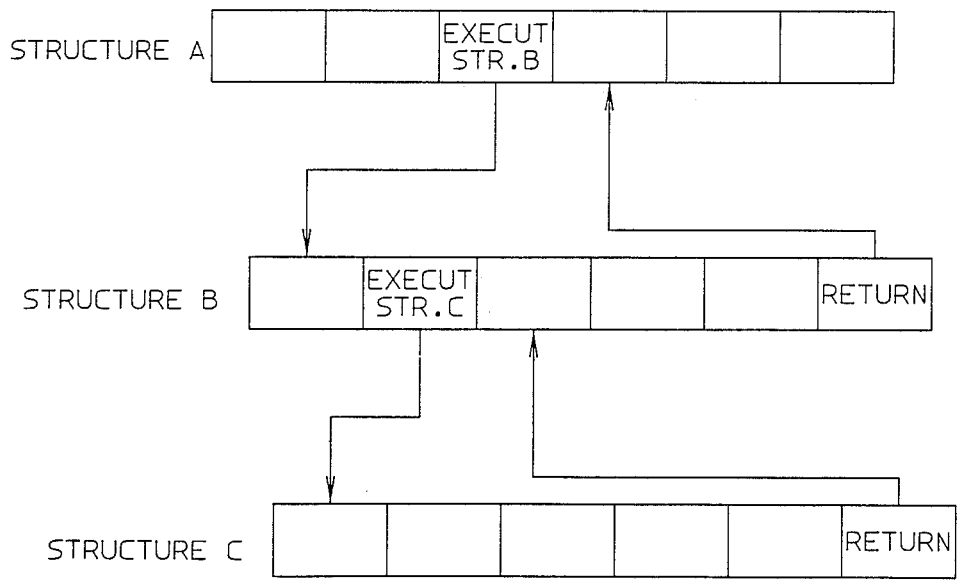
FIG. 9 is a schematic diagram showing the execute structure as in FIG. 8 with indications of required storage of traversal state information between structures.
Figure 10:
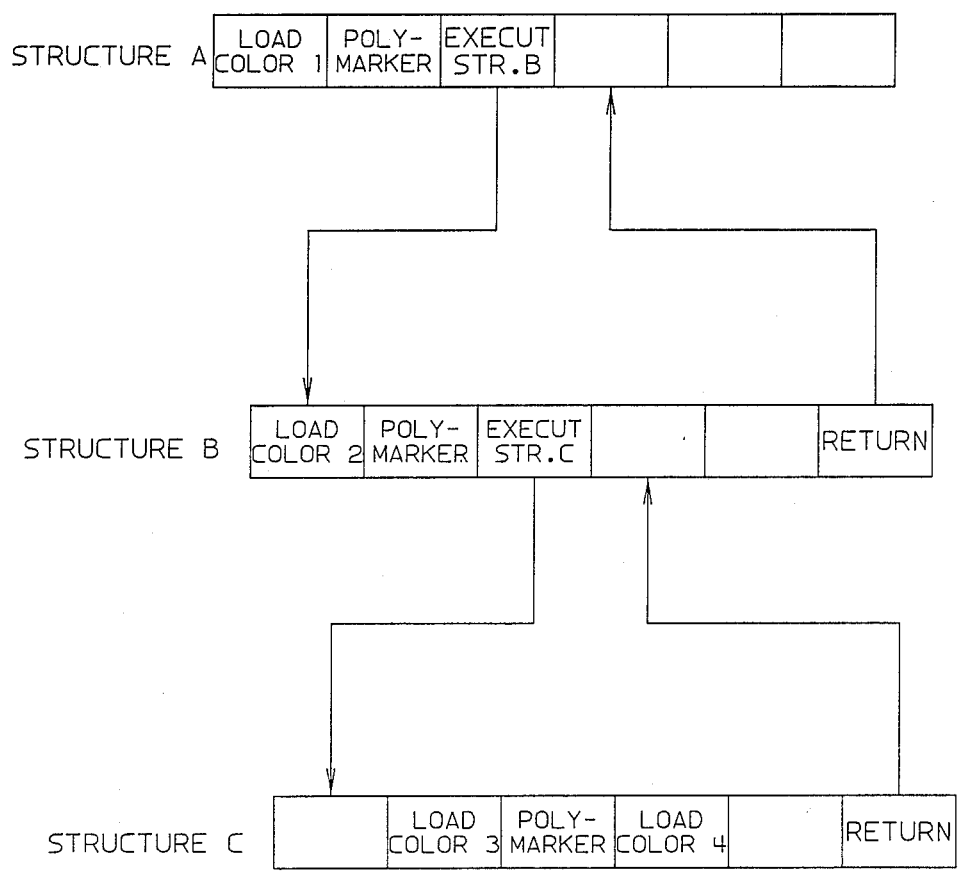
FIG. 10 is a schematic diagram of the structure of FIG. 8 showing a specific primitive "Polymarker".

When an "End of a Structure" is executed (return from a "called" structure), the stack is popped, and the attribute registers will be restored (see FIG. 9). The present invention will cause the contents of many registers to be saved (on the stack) and popper (from the stack). As shown by the example in FIG. 10, the only registers changed may have been associated with polymarker, the saving of all the other registers would be very time-consuming.

LOAD AND CONDITIONALLY PUSH REGISTERS

To eliminate the unnecessary stacking of the registers when "Execute Structure" is processed, 16 registers (240-255) are used as control flags to selectively save registers onto the stack. The control flags are used to ensure that only the registers used by a called structure are saved and that they are only save once, no matter how many times the registers change during a called structure execution.

Control flags for stacking registers

These registers contain 1 bit for each graphics interface register. These registers will be cleared each time traversal of a PHIGS structure is started. When a command to load PHIGS attribute registers is encountered, the control bits for the specified registers will be examined. If the bit is zero, the contents of the registers will be saved prior to loading the new value. The control bits will also be set at this time. If the control bits were already one, the contents of the registers will not be saved.

At the end of a root structure, there will a 'pop' to clean up the stack.

Figure 11:
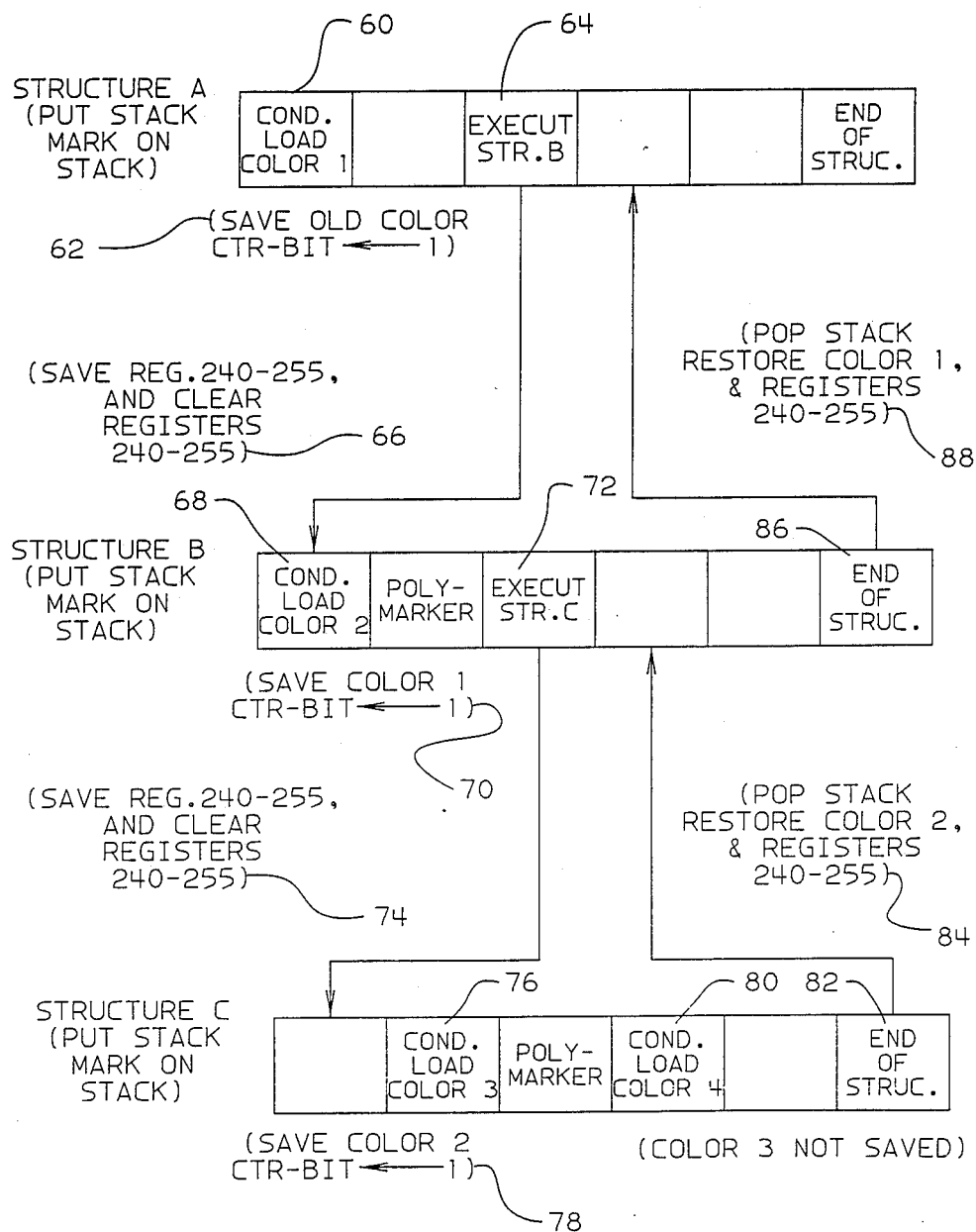
FIG. 11 is a schematic diagram of the structure as shown in FIG. 8 further including a new graphics order in accordance with the method of the present invention.

The Polymarker attribute registers individual color index (register 30) will be used as a example (FIG. 11).

If the bit is zero, then the display processor saves the corresponding color register on the stack, processes the structure element and set the corresponding bit of the stack control flags register to 1.

If the bit is one, then display processor processes the structure element, without putting anything on the stack.

When the 'return from an executed structure' is processed, the stack will be popped until the display processor encounters a stack mark.

Operation (See FIG. 11)

1. All control bits of registers 240–255 set to zero initially;
2. When the conditional load and push polymarker individual color register with color1 60 (will be denoted by conditional loading color below) is processed; because the (corresponding) control bit is 0, the existing color is saved on the stack, and the control bit is set to 1 62;
3. When the 'execute structure' B 64 is processed, a stack marker is put on the stack (as the limit of stack popping operation), the contents of registers 240–255 (control flags) will be saved on the stack; and all control bits of registers 240–255 are set to zero 66.
4. When the conditional loading color color2 68 is processed, color1 is sved on the stack, and the control bit is set to 1 70;
5. When the 'execute structure' C 72 is processed, a stack marker is put on the stack (as the limit of stack popping operation), the contents of registers 240–255 (control flags) will be saved on the stack; and all control bits of registers 240–255 are set to zero 74;
6. When the conditional loading color color3 76 is processed, color2 is saved on the stack, and the control bit is set to 1 78;
7. When the conditional loading color color4 80 is processed, because the (corresponding) control bit is 1, the existing color color3 is not saved on the stack;
8. When the 'end of structure' C 82 is processed, the stack is popper (to the stack marker). The contents of registers 240–255 (control flags corresponding to structure B) are restored, and so is color2 84;
9. When the 'end of structure' B 86 is processed, the stack is popped (to the stack marker). The contents of registers 140–255 (control flags corresponding to structure B) are restored, and so is the color1 88. (See FIG. 11).

While the invention has been particularly shown and described with reference to a preferred embodiment thereof, it will be understood by those skilled in the art that various changes in form and detail may be made therein without departing from the spirit and the scope of the invention.

What is claimed is:

1. A method for generating a display image on a graphics display system having a display processor connected to a general purpose processor, the image being generated in response to graphics orders, comprising the steps of:

performing the following steps for each graphic order:

entering graphic control information into an information interface area accessible to said display processor;

calculating pick data for a predetermined primitive specified by said graphic order;

testing said primitive for invisibility;

exiting to a next graphics order if said invisibility test is true;

testing said primitive for detectability;

exiting to a next graphics order if said detectability test is false when traversal is being peformed for pick correlation purposes;

determining whether a transformation environment update is required;

recalculating said transformation environment if required;

binding display attributes for said primitive;

entering graphic control information into an information interface are accessible to said display processor; and generating a display based on said graphics order and the graphic control information in said information interface area.

2. The method of claim 1, further comprising the steps of:

determining whether a highlight attribute is to be used with said primitive; and loading a color register with a highlight color for said primitive.

3. The method of claim 2, further comprising the steps of:

determining whether to use a bundle color if highlighting is not used; and loading said color register with a bundle color if it is determined that said bundle color is to be used; and loading said color register with an individual color if it is determined that said bundle is not to be used.

4. The method of claim 3 further comprising the steps of:

determining whether a bundle marker type is to be used with said primitive;

loading a marker type from said bundle table if said bundle marker type is to be used;

loading a marker type from an individual source if said bundle marker type is not to be used;

determining whether a bundle marker size is to be used;

loading a marker size from said bundle table if said bundle marker size is to be used; and loading a marker size from an individual source if said bundle marker is not to be used.

5. A method for generating a display image on a graphics display system having a display processor connected to a general purpose processor, comprising the steps of:

generating display processor control orders on said general purpose processor;

entering graphic control information into an information interface area accessible to said display processor; and generating a display based on the processor control orders and the graphic control information in said information interface area;

selectively storing said interface information area registers based upon the condition of flags representing the storage state of the information contained in a plurality of graphics interface registers;

determining from an examination of said flags which general interface registers have been previously stored; and storing only those additional general interface register contents required for traversal of a current processor control order which have not been previously stored.

6. The method of claim 5, further comprising the step of:

setting a flag corresponding to a predetermined graphics interface register when the contents of said graphics interface register, containing some portion of the traversal state information are stored.

7. A method for generating a display on a graphics display device comprising the steps of:

requesting drawing services including creating graphics orders;

constructing interface parameters required to perform said drawing services said interface parameters being stored separate from said graphics orders;

establishing a drawing service environment in response to said drawing services request and responsive to said interface parameters;

performing detailed drawing service to create said display in response to said graphics orders and responsive to said interface parameters;

terminating said drawing environment; and displaying said display on said graphics display device.

8. The method of claim 7, wherein said requesting drawing services step comprises:

generating graphics commands to establish a graphics interface area;

generating graphics primitive orders for establishing and terminating a drawing service environment, said environment being responsive to said graphics interface area; and generating graphics orders for creating said display within said drawing services environment.

9. The method of claim 8, wherein said graphics display device is a raster graphics terminal.

10. The method of claim 8, wherein said graphics display device is a laser printer.

* * * * *